(12) United States Patent
Becker et al.

(10) Patent No.: US 6,450,544 B2
(45) Date of Patent: Sep. 17, 2002

(54) COMBINATION MECHANICAL/FUSION PIPE FITTING

(75) Inventors: Allen R. Becker, Apex, NC (US); Robert V. Carter, Jr., Erie, PA (US)

(73) Assignee: Zurn Industries, Inc., Erie, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/887,516

(22) Filed: Jun. 22, 2001

Related U.S. Application Data

(63) Continuation of application No. 09/359,156, filed on Jul. 22, 1999, now Pat. No. 6,250,686
(60) Provisional application No. 60/117,110, filed on Jan. 25, 1999.

(51) Int. Cl.[7] .................................................. F16L 47/02
(52) U.S. Cl. ........................ 285/21.2; 285/342; 285/423
(58) Field of Search ........................ 285/423, 21.1, 285/21.2, 342, 343, 12; 214/544; 156/274.2, 296

(56) References Cited

U.S. PATENT DOCUMENTS

| | | | | |
|---|---|---|---|---|
| 2,287,889 A | * | 6/1942 | Krumsiek et al. | 285/166 |
| 2,473,118 A | * | 6/1949 | Wolfram | 285/342 |
| 2,824,756 A | * | 2/1958 | Wagner | 285/12 |
| 3,061,503 A | * | 10/1962 | Gould et al. | 156/272 |
| 3,788,928 A | * | 1/1974 | Wise | 156/294 |
| 3,830,532 A | * | 8/1974 | Roberts | 285/342 |
| 4,083,587 A | * | 4/1978 | Leczycki | 285/343 |
| 4,176,274 A | * | 11/1979 | Lippera | 219/522 |
| 4,436,988 A | * | 3/1984 | Blumenkranz | 219/535 |
| 4,493,985 A | * | 1/1985 | Keller | 219/535 |
| 4,508,368 A | * | 4/1985 | Blumenkranz | 285/21 |
| 4,877,270 A | * | 10/1989 | Phillips | 285/18 |
| 4,927,183 A | * | 5/1990 | Steinmetz et al. | 285/212 |
| 5,466,019 A | * | 11/1995 | Komolrachanaporn | 285/343 |
| 5,516,159 A | * | 5/1996 | Hirakawa et al. | 285/388 |
| 5,685,572 A | * | 11/1997 | Linton et al. | 285/212 |

FOREIGN PATENT DOCUMENTS

| | | | | |
|---|---|---|---|---|
| AT | 239018 | * | 3/1965 | 285/21 |
| DE | 4214279 | * | 11/1993 | 285/21 |
| JP | 404145294 | * | 5/1992 | 285/21 |
| JP | 404321892 | * | 11/1992 | 285/21 |
| JP | 405248586 | * | 9/1993 | 285/21 |
| JP | 406159582 | * | 6/1994 | 285/21 |

* cited by examiner

*Primary Examiner*—Eric K. Nicholson
(74) *Attorney, Agent, or Firm*—Webb Ziesenheim Logsdon Orkin & Hanson, P.C.

(57) ABSTRACT

A piping system that includes a plurality of pipe made of thermoplastic material, a coupling and an arrangement for securing the pipe to the coupling. The coupling is configured so that either a fusable seal or mechanical seal can be used with the coupling to connect the pipe to the coupling. Preferably, the pipe and coupling are made of thermoplastic material.

29 Claims, 6 Drawing Sheets

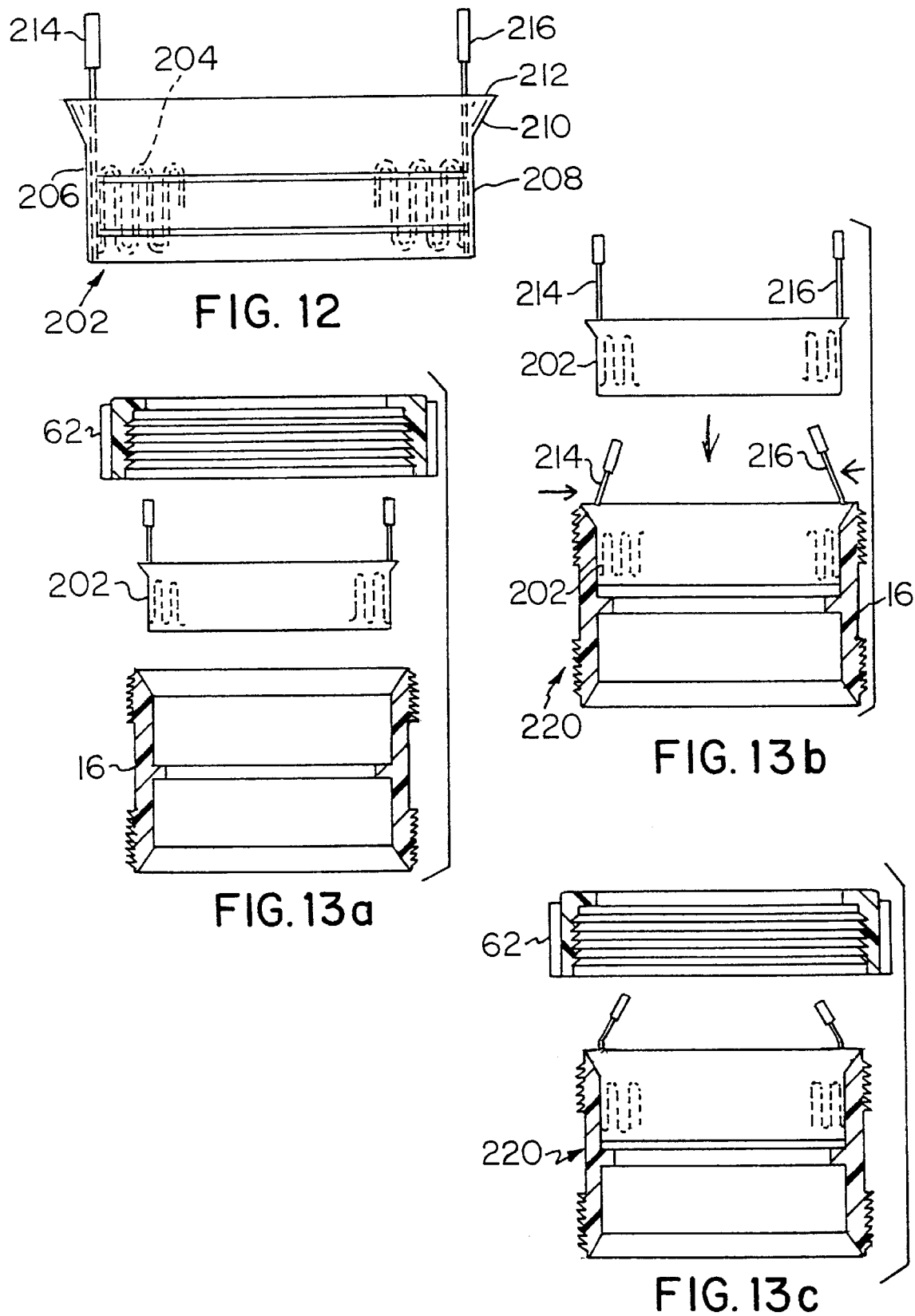

COMBINATION MECHANICAL/FUSION PIPE FITTING

CROSS-REFERENCE TO RELATED APPLICATIONS

The present application is a continuation of U.S. patent application Ser. No. 09/359,156 filed Jul. 22, 1999 entitled "Combination Mechanical/Fusion Pipe Fitting".

This application claims the benefit of U.S. Provisional Application Serial No. 60/117,110, Jan. 25, 1999 Now U.S. Pat. No. 6,250,686.

BACKGROUND OF THE INVENTION

1. Field of the Invention

The present invention relates to coupling of plastic pipes and, more particularly to coupling of plastic pipes by fusion welding or through a mechanical seal.

2. Description of the Prior Art

Prior to the advent of plastic pipe, most piping was made out of metal, such as copper, stainless steel or iron. The particular metal used for the piping was dependent upon the application. For example, water could be transported through copper and/or cast iron pipes. However, acids had to be transported in stainless steel pipe. Some of the metal pipe, such as copper and stainless steel, was expensive to manufacture and install. Typically, the pipe was either brazed or welded together. In some instances, mechanical type joints were provided for pipe connections. In today's market, all of these arrangements are expensive to manufacture and install.

Plastic pipe overcomes many of the expenses associated with metal pipe. Plastic pipe is inexpensive to manufacture and relatively easy and inexpensive to connect together. In the case of thermoplastic materials, such as polypropylene, the pipe can be welded together by providing a polypropylene sleeve with electrical heating elements embedded therein. This process is known as fusion welding. Fusion welded pipe is particularly applicable in situations where acid passes through the plastic pipe. Polypropylene pipe can be secured to each other through mechanical seals. In some applications, mechanical seals are preferable to the fusion welding.

In the past, different pipe couplings were provided for fusion sealing and mechanical sealing. This resulted in an increase in inventory required by the installer, such as the mechanical contractor or plumber, since two separate types of couplings were required, one for mechanical sealing and the other for fusion welding.

Therefore, it is an object of the present invention to provide a single coupling for use with mechanical sealing and fusion welding of plastic pipe.

SUMMARY OF THE INVENTION

The present invention is a piping system that includes a first pipe, a second pipe, a coupling, an arrangement for securing the first pipe to the coupling and an arrangement for securing the second pipe to the coupling. The first pipe is made of thermoplastic material having a first pipe first end. The second pipe is made of thermoplastic material having a second pipe first end. The coupling includes a body having a coupling first end and a coupling second end. The body has an outer surface and an inner surface. The inner surface defines a passageway and a lip positioned between the coupling first end and the coupling second end. The first pipe first end is received by the coupling first end and the second pipe first end is received by the coupling second end. The first pipe first end and the second pipe first end are positioned on opposite sides of the lip.

The pipe coupling can include pipe coupling threads defined on the outer surface of the coupling configured to engage with a nut, a first tapered inner surface adjacent the coupling first end and a second inner tapered surface adjacent the coupling second end and a plurality of circumferential rings defined on the inner surface. Axial ribs can be defined on the coupling outer surface and positioned between the threads positioned adjacent the coupling first end and the coupling second end.

The arrangement for securing the first pipe to the coupling and the arrangement for securing the second pipe to the coupling can be accomplished through a fusion seal or a mechanical seal. The fusion seal includes a sleeve made of thermoplastic material having an electrically resistive wire embedded therein and two leads attached to the electrically resistive wire extending from the sleeve. The sleeve is configured to be sandwiched between the pipe coupling and a thermoplastic pipe with the two leads extending from the piping coupling. The mechanical seal includes a flexible body received between the pipe coupling and the first pipe and a nut, the flexible body is held in place by the nut coacting with the pipe coupling and an end of the flexible body. The nut includes inner threads that coact with the pipe coupling threads. The nut includes an annular lip that defines a passageway configured to permit a thermoplastic pipe to pass there through, the annular lip contacts an end of the flexible body of the mechanical seal and holds the flexible body of the mechanical seal in place. The flexible body also includes a tapered portion adapted to coact with the first tapered inner surface of the pipe coupling.

The present invention can be provided as a kit for joining thermoplastic pipe together.

Further, the present invention is a method for joining two thermoplastic pieces of pipe, that includes the steps of:

a) providing two pieces of thermoplastic pipe;

b) attaching either a fusable seal or a mechanical seal at the ends of each the pieces of thermoplastic pipe;

c) passing the ends of the pieces of thermoplastic pipe with the seals through ends of a thermoplastic pipe coupling and sandwiching the seals between the pipe coupling and the pieces of thermoplastic pipe; and d) forming a fluid tight seal between the pieces of thermoplastic pipe and the pipe coupling by either compressing the mechanical seal with a nut coacting with the pipe coupling or heating the sleeve until the sleeve and adjacent portions of the pipe coupling and the pipe melt.

BRIEF DESCRIPTION OF THE DRAWINGS

FIG. 12 is an elevational view of the second embodiment of a fusion seal made in accordance with the present invention and shown in FIG. 11; and FIGS. 13a–13e are representations showing a sequence of steps for joining pipe together with the fusion seal shown in FIGS. 11 and 12.

DESCRIPTION OF THE PREFERRED EMBODIMENTS

Figure 1:
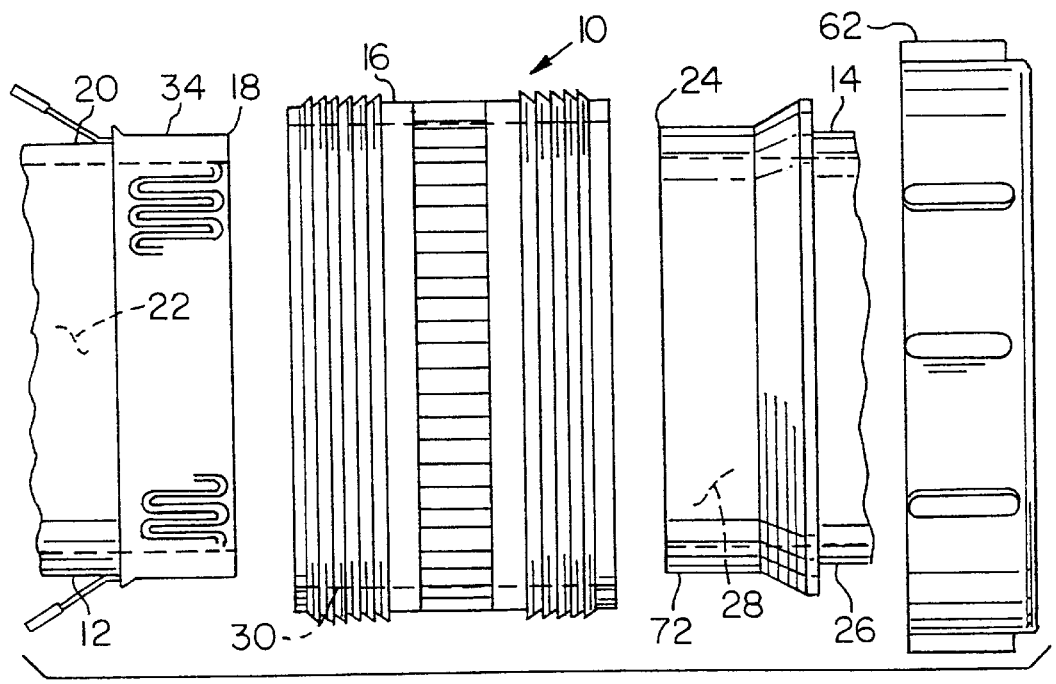
FIG. 1 is an exploded elevational view of a pipe coupling system that includes pipe, a fusion seal, a mechanical seal, a coupling and a nut made in accordance with the present invention.
Figure 2:
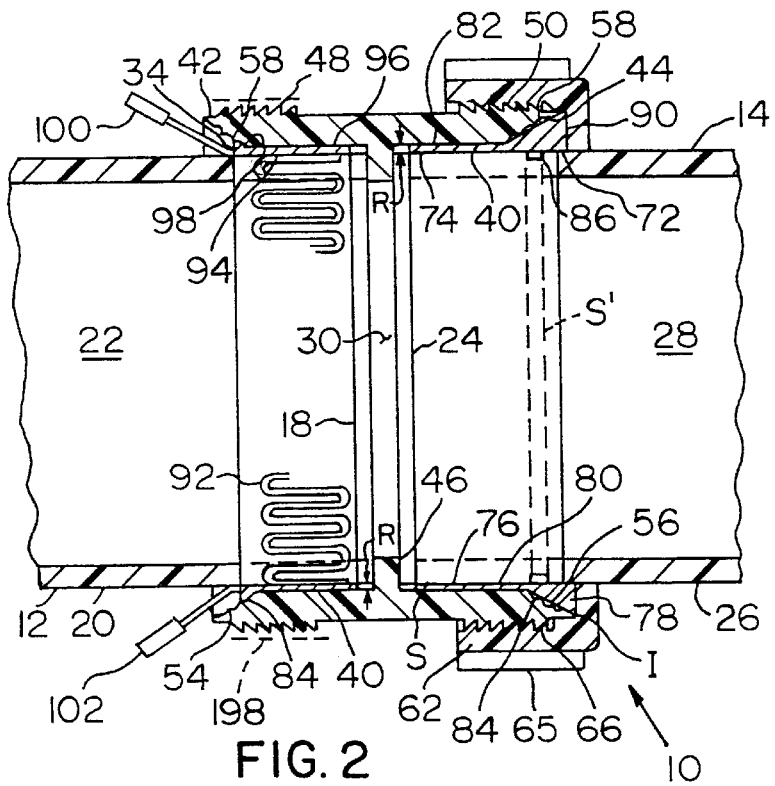
FIG. 2 is an elevational view, partially in section, of the piping coupling system shown in FIG. 1.

FIG. 1 shows a pipe coupling system 10 made in accordance with the present invention. The pipe coupling system 10 includes a first thermoplastic pipe 12 and a second thermoplastic pipe 14 secured to each other by a pipe coupling or pipe fitting 16. Preferably, the first thermoplastic pipe 12 and the second thermoplastic 14 are made of a polypropylene, such as a polypropylene from Montell North America, Three Little Falls Centre, 2801 Centerville Road, Wilmington, Del. 19808. The first thermoplastic pipe 12 includes a first thermoplastic pipe first end 18 and a first thermoplastic pipe outer surface 20. A first thermoplastic pipe passageway 22 is defined by an inner surface of the first thermoplastic pipe. The second thermoplastic pipe 14 includes a second thermoplastic pipe 14 first end 24 and a second thermoplastic pipe outer surface 26. An inner surface of the second thermoplastic pipe 14 defines a second thermoplastic pipe passageway 28. The pipe coupling 16 includes an inner surface that defines a pipe coupling passageway 30. As shown in FIG. 2, the first thermoplastic pipe passageway 22, the second thermoplastic pipe passageway 28 and the pipe coupling passageway 30 are in fluid communication with each other. Generally speaking, the first thermoplastic pipe 12, the second thermoplastic pipe 14 and the pipe coupling 16 are substantially cylindrically in shape. However, the passageways defined therein may take other forms, such as square.

Figure 3:
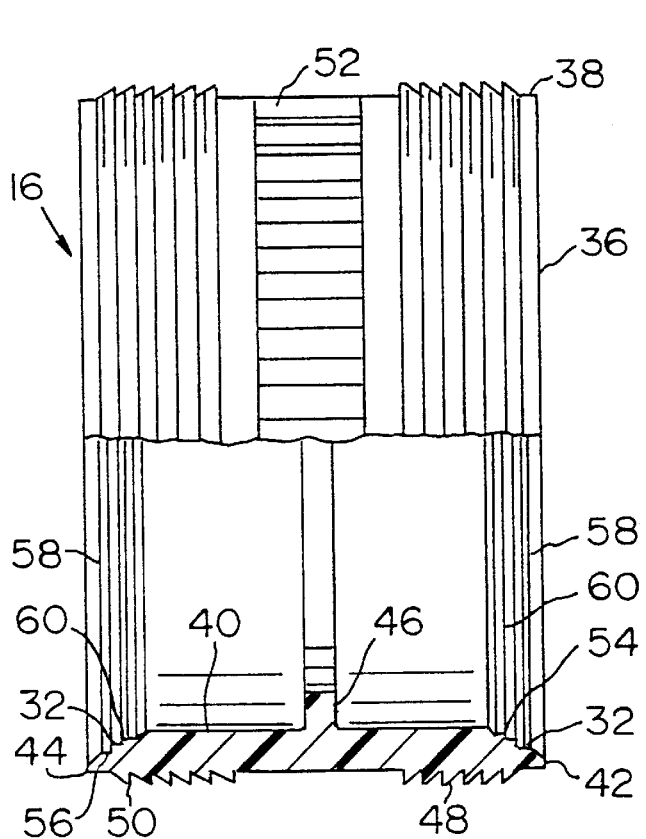
FIG. 3 is a elevational view, partially in section, of the coupling shown in FIG. 1.

Referring to FIGS. 2 and 3, the pipe coupling 16 includes a mechanical sealing surface 32 and is adapted or configured to receive a fusion seal 34. Preferably, the pipe coupling 16 is made of thermoplastic material, which is the same thermoplastic material used for the first thermoplastic pipe 12 and the second thermoplastic pipe 14. Referring specifically to FIG. 3, the pipe coupling 16 includes a pipe coupling body 36 having a pipe coupling outer surface 38 and a pipe coupling inner surface 40. The pipe coupling 16 includes a pipe coupling first end 42 and an oppositely positioned pipe coupling second end 44. An annular lip 46 is defined by the pipe coupling inner surface 40 midway between the pipe coupling first end 42 and the pipe coupling second end 44, which are positioned on opposite sides of the annular lip 46. A first set of threads 48 is defined adjacent the pipe coupling first end 42 and a second set of threads 50 is defined adjacent the pipe coupling second end 44. The threads 48 and 50 are defined as the pipe coupling outer surface 38. Axially extending exterior ribs 52 are circumferentially spaced about the pipe coupling outer surface 38. Alternatively, a plurality of flat surfaces can be provided in lieu of the exterior ribs 52, to form a geometric shape, such as a hexagon or octagon.

The exterior ribs 52 are positioned between the first set of threads 48 and the second set of threads 50. A first inner tapered surface 54 and a second inner tapered surface 56 are defined by the pipe coupling inner surface 40 and are adjacent the pipe coupling first end 42 and the pipe coupling second end 44. A plurality of inwardly positioned axially spaced circumferential rings 58 (such as two, three or four rings) are positioned on the first inner tapered surface 54 and the second inner tapered surface 56. Recesses 60 are defined between the circumferential rings 58.

Figure 4:
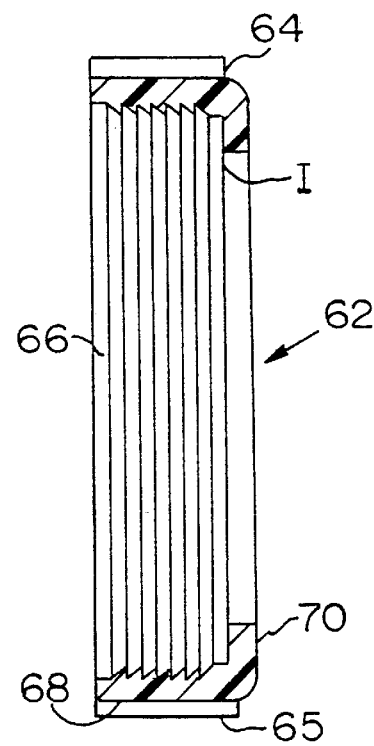
FIG. 4 is a sectional elevational view of the nut shown in FIG. 1.

FIGS. 2 and 4 show a nut 62 that is used in the pipe coupling system 10 when a mechanical seal is used and configured to coact with the first set of threads 48 and the second set of threads 50 of the pipe coupling 16. The nut 62 is preferably made of a polypropylene and includes a body 64. Preferably, the nut 62 is made of the same thermoplastic material as the coupling 16. Axially extending ribs 65 are positioned about an outer surface of the body 64. Inner threads 66 are defined about an inner surface of the body 64. The body includes cylindrical first portion 68 that includes the inner threads 66, and an annular lip second portion 70 that is integrally connected to the cylindrical first portion 68. A passageway is defined by the annular lip 70 and the cylindrical first portion 68 through which a thermoplastic pipe, such as the first thermoplastic pipe 12 and the second thermoplastic pipe 14, can extend.

Figure 7:
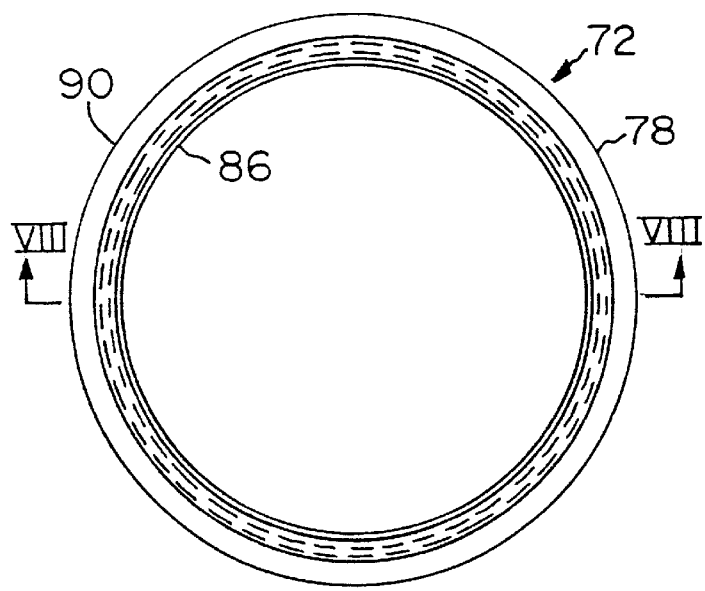
FIG. 7 is a plan view of the mechanical seal shown in FIG. 1.
Figure 8:
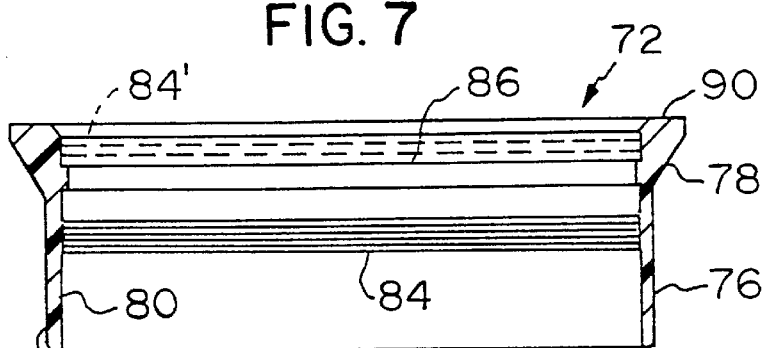
FIG. 8 is a section taken along line VIII—VIII of FIG. 7.

FIGS. 2, 7 and 8 show a mechanical seal 72 made in accordance with the present invention. Preferably, the mechanical seal 72 is flexible and made of a low density polyethylene (LDPE), which is manufactured by Mobil Polymers, 2195 Lincoln Highway, Edison, N.J. The mechanical seal 72 is adapted to be received between a gap 74 defined between a pipe, in this case the second thermoplastic pipe 14, and the pipe coupling 16, as shown in FIG. 2. The mechanical seal 72 includes a flexible body having a cylindrical portion 76 integrally attached to a tapered portion 78. The mechanical seal 72 includes a substantially cylindrical inner surface 80 and an outer surface 82. A plurality of inner circumferential rings 84 are defined on the inner surface 80 of the cylindrical portion 76 and a ring 86 is defined on the inner surface 80 of the tapered portion 78. Alternatively, the inner circumferential rings 84 may be eliminated or a circumferential ring 84', shown in phantom, can be provided. The circumferential rings 84 and ring 86 are adapted to sealingly coact with an outer pipe surface "Is", which in this case is the second thermoplastic pipe outer surface 26. The ring 86 is adapted to be received in a recess defined in the outer pipe surface for alignment of the mechanical seal 72 on the respective pipe. An abutting end 90 is defined on the tapered portion of the mechanical seal 72.

Figure 9:
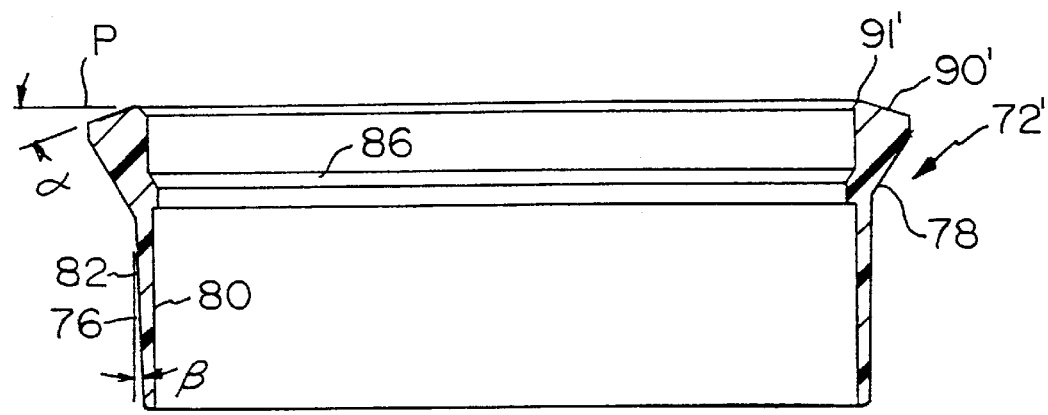
FIG. 9 is a section of a second embodiment of a mechanical seal similar to the section shown in FIG. 8.

FIG. 9 shows a second embodiment of a mechanical seal 72', which is similar to the mechanical seal 72, except for the below noted differences. The mechanical seal 72' includes an angled abutting end 90'. An angle α of the angled abutting end 90' is defined from a plane P and is preferably between 5°–10°. An uppermost portion 91' is adapted to be positioned adjacent the outer pipe surface "s". The outer surface 82 of the cylindrical portion 76 can have a slight taper such as 1° as represented by the angle β. The previously described circumferential rings 84 and 84' may be provided.

Figure 5:
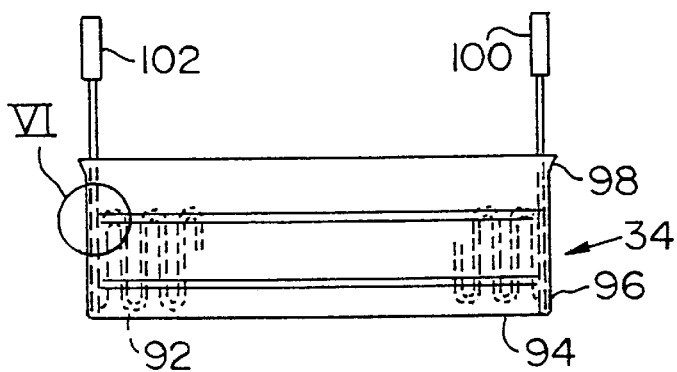
FIG. 5 is an elevational view of the fusion seal shown in FIG. 1.
Figure 6:
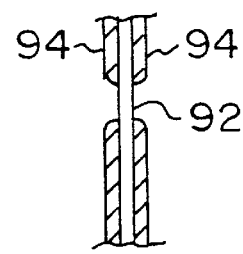
FIG. 6 is a partial sectional view of a portion of the fusion seal shown in FIG. 5.

FIGS. 2, 5 and 6 show the fusion seal 34 made in accordance with the present invention. The fusion seal 34 includes a circumferential-looped electrical resistive wire 92 embedded within a cylindrical thermoplastic sleeve 94. Preferably, the electrical resistive wire or heating element 92 is made out of nickel-chrome or a normal heating wire with nickel plate. Preferably, the electrical resistive wire 92 is made of eighteen (18) gage wire and has a resistance measured in ohms per inch. The resistance of the wire varies depending on the application. Further, preferably the thermoplastic sleeve is made of a polypropylene, such as that previously described and used for the thermoplastic pipe 12 and 14. The thermoplastic sleeve 94 includes a cylindrical portion 96 and an integral tapered portion 98. Exposed electrical resistive wire lead 100 and 102 are attached to the resistive wire 92.

The method of connecting, the first thermoplastic pipe 12 to the second thermoplastic pipe 14 using the coupling 16 is set forth as follows. Initially, the installer must decide whether the thermoplastic pipes 12 and 14 are to be mechanically sealed or sealed through fusion welding. In some instances, one of the thermoplastic pipe 12 or 14, is to mechanically sealed to the pipe coupling 16 and the other of the thermoplastic pipe 12 or 14 is to be fusion welded to the pipe coupling 16. For the purpose of example, the latter situation, which is shown in FIGS. 1 and 2, is described as follows.

The fusion seal 34 is slid over the first thermoplastic pipe first end 18, as shown in FIG. 2. The tapered portion 98 of the fusion seal 34 is positioned away from the first thermoplastic first end 18 and the cylindrical portion 96 of the fusion seal 34 is positioned adjacent the first thermoplastic pipe first end 18. The first thermoplastic pipe first end 18 with the fusion seal 34 is then positioned through and received by the pipe coupling first end 18 and within the pipe coupling 36 until the first thermoplastic pipe first portion 18 abuts against the annular lip 46. In this arrangement, the cylindrical portion 96 abuts against the pipe coupling inner surface 40 and the tapered portion 98 of the fusion seal 34 abuts against a portion of the first inner tapered surface 54. Preferably, the tapered portion 98 abuts against one of the circumferential rings 84, as shown in FIG. 2. The electrical resistive wire leads 100 and 102 extend away from the pipe coupling 16 and the pipe 12. Preferably, the thickness of the gap 74, as designated by R, is less than or equal to the thickness of the thermoplastic sleeve 94. Therefore, the thermoplastic sleeve 94 is sandwiched and compressed between the pipe coupling 16 and the pipe 12. Preferably, a clamp 198 (shown in phantom in FIG. 2), such as model number 942AD-0550 H98, manufactured by Clampco of Wadsworth, Ohio, is placed around the pipe coupling outer surface and over the sleeve 94. The clamp is tightened to apply radial pressure and force to the pipe 12, pipe coupling 16 and the sleeve 94.

Electric current, having a voltage of typically 120 volt AC (alternating current), is passed through the resistive wire 92 via the leads 100 and 102. The electric current causes the resistive wire 92 to heat, thereby causing the thermoplastic sleeve 94 and adjacent portions of thermoplastic pipe 12 and the pipe coupling 16 to melt. After a period of time, the electric current is stopped from passing through the resistive wire 92. The thermoplastic of the pipe 12, the pipe coupling 16 and the sleeve 94 are permitted to cool and harden, thereby forming a fluid tight seal between the first thermoplastic pipe 12 and the coupling 16. The clamp 200 is removed. The exposed leads 100 and 102 and the exposed resistive wire 92 may then be cut and removed from the thermoplastic sleeve 94. Alternatively, the exposed leads 100 and 102 can be left alone for future heating and melting of the thermoplastic sleeve 94, should a leak develop or the pipe need to be replaced.

Referring again to FIG. 2, the mechanical seal 72 is slidably received by the second thermoplastic pipe 14 so that the tapered portion 78 is positioned away from the second thermoplastic pipe first end 24 and the cylindrical portion 76 of the mechanical seal 72 is positioned adjacent the second thermoplastic pipe first end 24. Preferably, an annular slot "s'" is defined on the second thermoplastic pipe outer surface 26 near the second thermoplastic pipe first end 24 so that the ring 86 is received therein for aligning the mechanical seal 72 with the thermoplastic pipe first end 24 and the coupling 16. The inner circumferential rings 84 abut against the second thermoplastic pipe outer surface 26. The second thermoplastic pipe 14 is then inserted into and received by the pipe coupling second end 44 until the second thermoplastic pipe first end 24 nearly abuts against the annular lip 46. In this arrangement, the cylindrical portion 76 of the mechanical seal 72 is positioned between the second thermoplastic pipe outer surface 26 and the pipe coupling inner surface 40. The tapered portion 78 of the mechanical seal 72 abuts against the second inner tapered surface 56. The circumferential rings 58 positioned on the second inner tapered surface 56 of the pipe coupling 36 contact the tapered portion 78 of the mechanical seal 72. The abutting end 90 of the mechanical seal 72 extends beyond the pipe coupling second end 44. The nut 62, which is initially slid onto the second thermoplastic pipe 14 through the annular lip 70 and cylindrical first portion 68, is then threadably engaged with the second set of threads 50 until an inner surface I of the annular lip 70 contacts the abutting end 90. The nut 62 is further tightened, preferably with wrenches or other tightening mechanism, which engage with axial ribs 65 of the nut 62 and the axially extending exterior ribs 52 of the pipe coupling 16, urging the mechanical seal 72 toward the annular lip 46 of the pipe coupling 16. This action causes the mechanical seal 72 to expand in the radial direction and compress along the axial direction, thereby forming a fluid seal between the second thermoplastic pipe 14 and the pipe coupling 16. In other words, the flexible body of the mechanical seal 72 is held in place by the nut 62 coacting with the pipe coupling 16 and the abutting end 90. The seal 72' can be used in lieu of seal 72. It has been found that the angled abutting end 90' improves engagement of the seal 72' by concentrating the force applied by the nut 62 to the uppermost portion 91'. It is believed that the angled abutting end 90' eliminates the need of heating the mechanical seal to slip over the thermoplastic pipe which may be necessary in prior art mechanical seal arrangements.

In many instances, pipe will be connected to both ends of the pipe coupling 16 in the same manner, i.e., either through mechanical seals 72 or fusion seals 34. It should be understood that the pipe coupling system shown in FIG. 2 could include two mechanical seals 72 or two fusion seals 34 as opposed to one mechanical seal 72 and one fusion seal 34. As should be evident, the nut 62 is only used with the mechanical seal.

The present invention overcomes the disadvantage of the prior art, which requires separate inventory for fusion seal type couplings and mechanical seal type couplings. The present invention utilizes only one pipe coupling design for both mechanical seals and fusion seals. The nuts 62, the fusion seals 34 and the mechanical seals 72 are used on an as needed basis. The present invention, thereby, reduces the cost for tooling of separate couplings. Further, the present invention provides for an easy installation of mechanical seals where fusion seals are not necessary. In the case of mechanical seals, the present invention does not require the mechanical seals to be heated for the seals to be easily slid onto the pipe, as is the case in the prior art.

Figure 10:
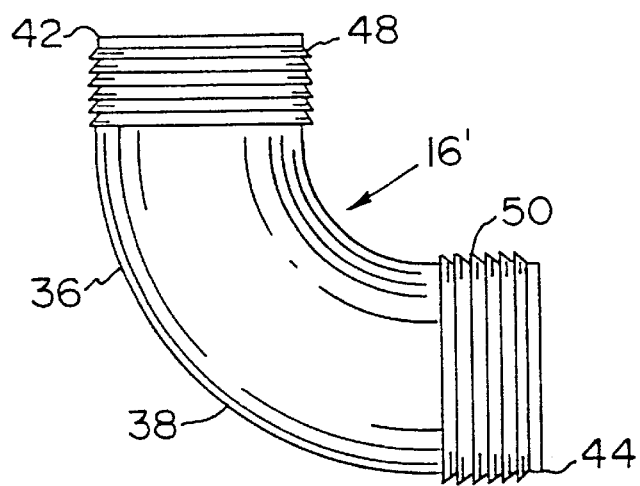
FIG. 10 is an elevational view of an elbow-shaped coupling made in accordance with the present invention.

FIG. 10 shows a second embodiment of the pipe coupling designated as pipe coupling 16'. Pipe coupling 16' is the same as pipe coupling 16 except that it is in the form of an elbow fitting as opposed to a substantially cylindrical shape, as shown in FIGS. 1–3. All other aspects of the pipe coupling 16' are the same as pipe coupling 16. FIGS. 11–13e show another embodiment of a pipe coupling system 200 made in accordance with the present invention. The pipe coupling system 200 incorporates many of the previously described parts and therefore like reference numerals will be used for like parts.

Figure 11:
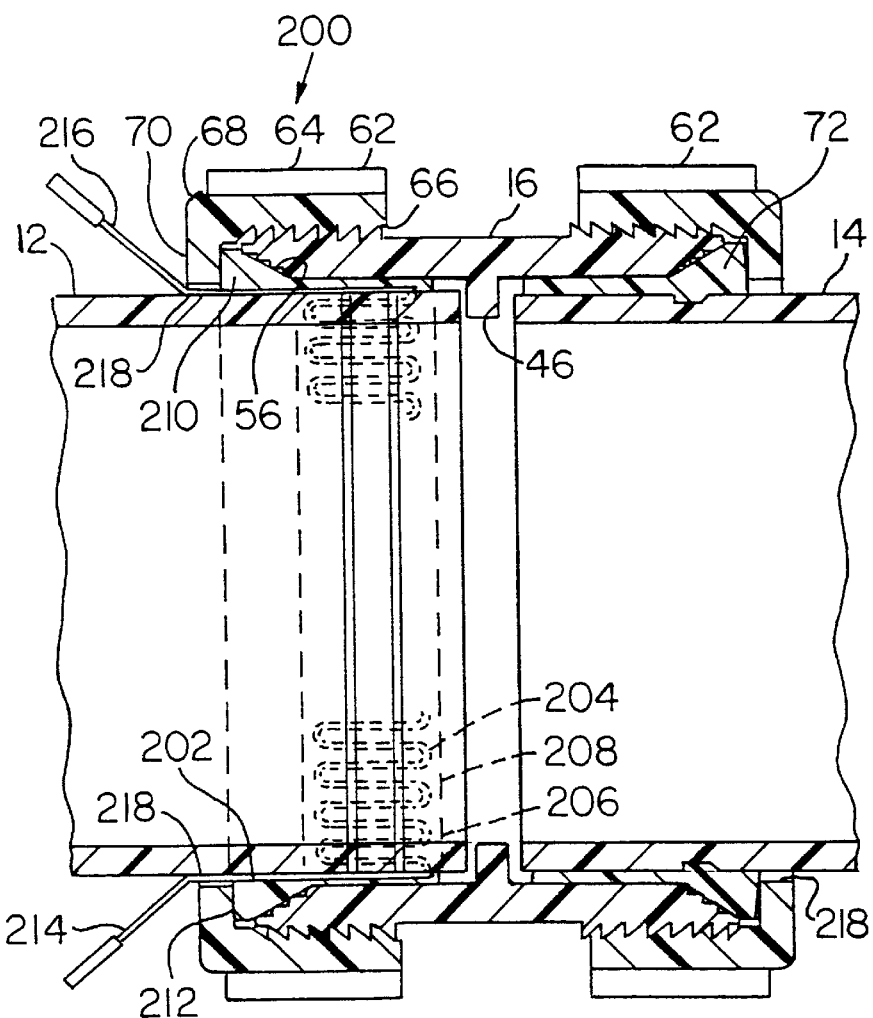
FIG. 11 is another embodiment of a pipe coupling system made in accordance with the present invention.

Referring to FIG. 11, the pipe coupling system 200 includes a first thermal plastic pipe 12, a second thermal plastic pipe 14 secured to each other by a pipe coupling or pipe fitting 16. The second thermoplastic pipe 14 is secured to the coupling 16 through a mechanical seal 72 and a nut 62 in the manner previously described herein. The first thermoplastic pipe 12 is secured to the pipe coupling 16 through a nut 62 and a fusion seal 202 made in accordance with the present invention.

Figure 13D:
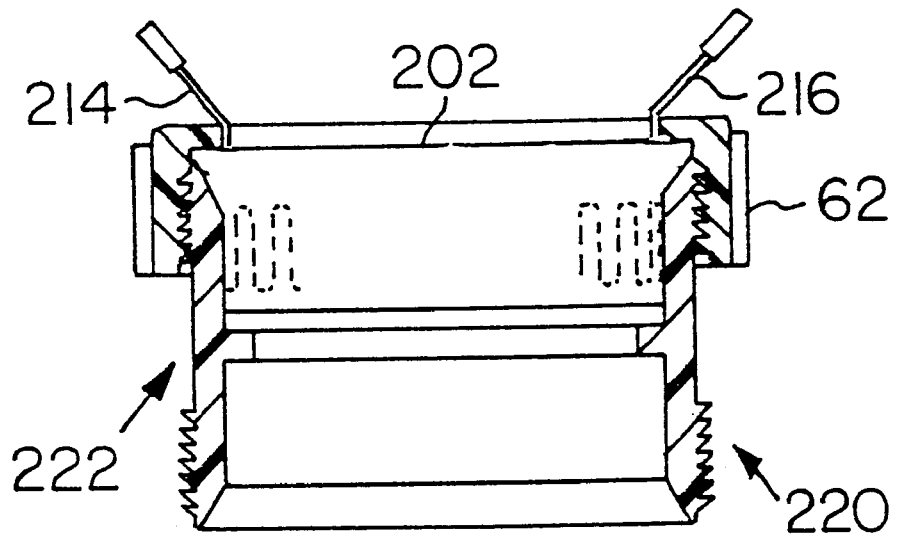

Referring to FIGS. 11 and 12, the fusion seal 202 is similar to the fusion seal 34 previously described herein. Specifically, the fusion seal 202 includes a circumferential-looped electrical resistive wire 204 embedded within a cylindrical thermoplastic sleeve 206. Preferably, the electrical resistive wiring heating element 204 is made of nickel-chrome or a normal heating wire with nickel plate. Preferably, the electrical resistive wire 204 is made of eighteen (18) gauge wire and has a resistance measured in ohms per inch. The resistance of the wire varies depending on the application. Further, preferably the thermoplastic sleeve is made of polypropylene, such as that previously described and used for the fusion seal 34. The thermoplastic sleeve 206 includes a cylindrical portion 208 and an integral tapered portion 210. The tapered portion 210 includes abutting end 212. Exposed electrical resistive wire leads 214 and 216 are attached to the resistive wire 204. As should now be evident, the difference between the fusion seal 34 and the fusion seal 202 is the relative size of the tapered portions 98 and 210, respectively. method of connecting the first thermoplastic pipe 12 to the coupling 16 using the fusion seal 202 shown in FIG. 13a is set forth as follows. Initially, the installer places the fusion seal inside of the pipe coupling 16 so that the cylindrical portion 208 of the fusion seal 200 is received within the interior of the pipe coupling 16 and the tapered portion 210 abuts against the tapered surface 56 of the pipe coupling 16. The installer then bends the wire leads 214 and 216 inwardly, as shown in FIG. 13b forming a first subassembly 220. FIG. 13b shows the fusion seal 202 separately and the first subassembly 220 separately. Then the nut 62 is threadably received by the coupling 16 via pipe coupling threads 50 so that the leads 214 and 216 pass through the nut opening defined by the annular lip 70 and the abutting end 212 abuts against an inner surface of the annular lip 70 and the tapered portion 210 is sandwiched between the annular lip 70 and the tapered surface 56 of the pipe coupling as shown in FIG. 13c. During tightening of the nut 62 onto the coupling 16, the inner surface of the annular lip 70 is pushed down and compresses the tapered portion 210. The wire leads 214 and 216 are then bent outwardly forming a second subassembly 222, as shown in FIG. 13d. In this arrangement, a portion of the tapered portion 210 extends beyond an end of the pipe coupling 16, as shown in FIG. 11.

Figure 13E:
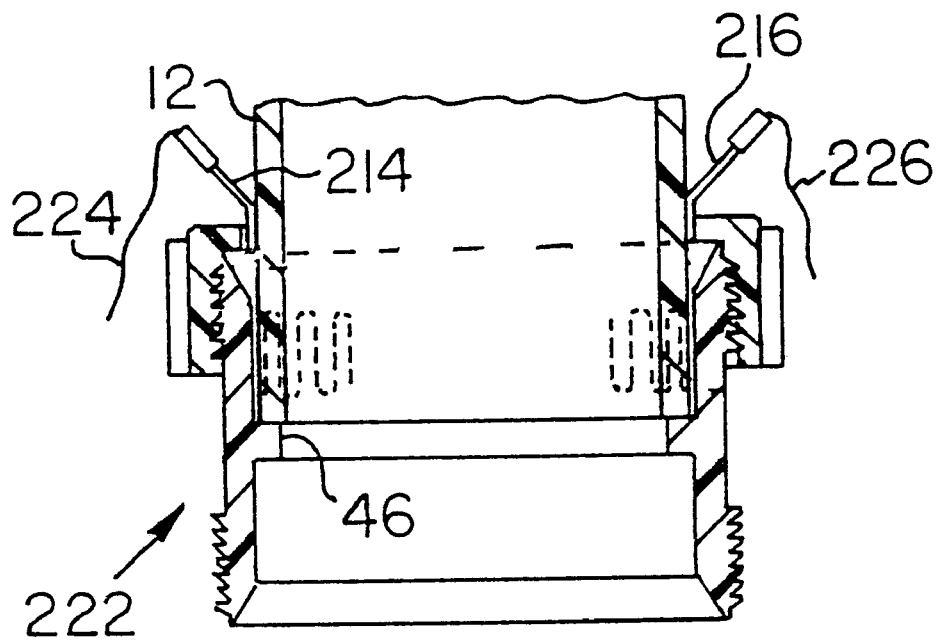

An end of the first thermoplastic pipe 12 is passed through a portion of the second subassembly 222 until it abuts against or is positioned near the annular lip 46 of the pipe coupling 16, as shown in FIG. 13e. As can be seen in FIGS. 11 and 13e, the pipe leads 212 and 214 pass through a gap 218 defined between an inner surface of the annular lip 70 and an outer surface of the first thermoplastic pipe 12. Preferably, the inner diameter of the thermoplastic sleeve 206 is slightly less than the outer diameter of the first thermoplastic pipe 12 so that a pressed fit is formed. Further, after the first thermoplastic pipe 12 is placed within the second subassembly 222, the respective nut 62 is further tightened with a spanner to further compress the tapered portion 210, thereby causing the thermoplastic sleeve 206 to be forced against the outer surface of the first thermoplastic pipe 12. Leads 224 and 226 are then connected to wire leads 214 and 216 and electric current, as previously described, is passed through the leads 224 and 226, causing the thermoplastic sleeve 202 and adjacent portions of the thermoplastic pipe 12 and pipe coupling 16 to melt as previously described.

The fusion seal 202 eliminates the need for clamps that are typically associated with fusion seals, such as hub clamps. The hub clamps are tightened around the pipe section implementing the fusion seal and whereby, after the fusion seal is sealed between the pipe and the coupling, the hub clamp is removed. The purpose of the hub clamp is to place pressure around the fusion seal and the coupling and pipe. This is eliminated by use of the present invention. Further, the present invention provides a more aesthetically pleasing appearance of the fused joint whether a mechanical or a fusion seal is also implemented on the other side of the coupling 16, since nuts 62 are always positioned on opposite sides of the pipe coupling 16 irrespective of whether a mechanical seal or a fusion seal is used.

The present invention can be supplied as a kit for connecting thermoplastic pipe when the kit includes a coupling 16 or 16' and related accessories including one or more nuts 62, fusion seals 34 or 202 and mechanical seals 72 or 72'. Also, although thermoplastic is the preferable material for the components making up the invention, it is contemplated that other plastic materials or copolymers can be used.

Although the present invention has been described in detail in connection with the discussed embodiments, various modifications may be made by one of ordinary skill in the art without departing from the spirit and scope of the present invention. Therefore, the scope of the present invention should be determined by the attached claims.

We claim:

1. A piping system incorporating a mechanical seal and/or a fusion seal comprising:

a first pipe made of thermoplastic material having a first pipe first end;

a conduit for receipt of either a mechanical seal or a fusion seal having a body, said body having a conduit first end, said body having an outer surface and an inner surface, said inner surface defining a passageway, and a first receiving profile, said first pipe first end received by said conduit first end, said first receiving profile positioned coaxial with said first pipe; and first means for securing said first pipe to said conduit, said first means comprising either a mechanical seal or a fusion seal whereby said first receiving profile is configured to receive both said fusion seal or said mechanical seal individually but not both said fusion seal and said mechanical seal together.

2. A piping system as claimed in claim 1, wherein said conduit includes threads defined on said outer surface of said conduit adjacent said conduit first end.

3. A piping system as claimed in claim 2, further comprising axially extending ribs defined about said conduit outer surface and positioned between said threads positioned adjacent said conduit first end and said conduit second end.

4. A piping system as claim 1, wherein said conduit includes a first inner tapered surface adjacent said conduit first end.

5. A piping system as claimed in claim 4, wherein said conduit includes threads defined on said outer surface of said conduit adjacent said conduit first end.

6. A piping system as claimed in claim 5, further comprising axially extending ribs defined about said conduit outer surface.

7. A piping system as claimed in claim 1, wherein said fusion seal comprises a sleeve made of thermoplastic material having an electrically resistive wire embedded therein; and two leads attached to said electrically resistive wire extending from said sleeve, said sleeve sandwiched between said conduit and said first pipe with said two leads extending from said conduit.

8. A piping system as claimed in claim 1, wherein said mechanical seal includes a flexible body received between said conduit and said first pipe; and a nut, said flexible body held in place by said nut coacting with said conduit and an end of said flexible body.

9. A piping system as claimed in claim 7, wherein said sleeve includes a tapered end adapted to coact with a tapered inner surface of said conduit.

10. A piping system as claimed in claim 9, wherein said electrically resistive wire is looped circumferentially within said sleeve.

11. A piping system as claimed in claim 9, further comprising a nut, said sleeve held in place by said nut coacting with threads defined on said conduit and said tapered end of sleeve.

12. A piping system as claimed in claim 9, wherein said electrically resistive wire is looped circumferentially within said sleeve.

13. A pipe conduit for use with a thermoplastic fusable seal and a mechanical seal, comprising:

a body having a first end and a second end, said body having an outer surface and an inner surface, said inner surface defining a passageway and a first receiving profile, wherein said first receiving profile is configured to receive both the fusion seal or the mechanical seal individually but not both the fusion seal and the mechanical seal together;

threads defined on said outer surface of said conduit adjacent said first end; and a first inner tapered surface adjacent said first end including a circumferential ring.

14. A kit for joining thermoplastic pipe together comprising:

a pipe conduit, wherein said pipe conduit includes a thermoplastic body, said body having a first end and a second end, an outer surface defining threads and an inner surface, said inner surface defining a passageway, a first inner tapered surface adjacent said pipe conduit first end;

a mechanical seal, wherein said mechanical seal includes a flexible mechanical seal body having a tapered portion adapted to coact with said first inner tapered surface, said mechanical seal flexible body having an inner surface configured to sealingly receive a thermoplastic pipe;

a fusion seal, wherein said fusion seal includes a thermoplastic sleeve having a heating element, said sleeve includes a tapered end adapted to coact with said first inner tapered end, said sleeve having an inner surface configured to receive a thermoplastic pipe; and a nut, said nut having a body with threads configured to be threadably received by said pipe conduit and adapted to contact said tapered portion of said flexible mechanical seal body when said flexible mechanical seal body is received by said pipe conduit.

15. A piping system comprising:

a first pipe made of thermoplastic material having a first pipe first end;

a conduit having a body, said body having a conduit first end and a conduit second end, a first inner tapered surface positioned adjacent said conduit first end, a plurality of circumferential rings defined on said first inner tapered surface, said body having an outer surface and an inner surface, said inner surface defining a passageway, said first pipe first end received by said conduit first end; and means for securing said first pipe to said conduit.

16. A piping system comprising:

a first pipe made of thermoplastic material having a first pipe first end;

a conduit having a body, said body having a conduit first end and a conduit second end, said conduit includes a first inner tapered surface positioned adjacent said conduit first end, threads defined on said outer surface of said conduit adjacent said conduit first end, axially extending ribs defined about said conduit outer surface positioned adjacent said conduit first end, a plurality of circumferential rings defined on said first inner tapered surface, said body having an outer surface and an inner surface, said inner surface defining a passageway, said first pipe first end received by said conduit first end, said first pipe first end; and means for securing said first pipe to said conduit.

17. A piping system comprising:

a first pipe made of thermoplastic material having a first pipe first end;

a nut;

a conduit having a body, said body having a conduit first end and a conduit second end, conduit threads defined on said outer surface of said conduit threadably engaged with said nut, a first tapered inner surface adjacent said conduit first end, a plurality of circumferential rings defined on said inner surface, said body having an outer surface and an inner surface, said inner surface defining a passageway, said first pipe first end received by said conduit first end;

means for securing said first pipe to said conduit; and wherein said means for securing said first pipe to said conduit is through a fusion seal or a mechanical seal, said mechanical seal including a flexible body received between said conduit and said first pipe, said mechanical seal body sealingly contacting said first tapered inner surface and circumferential ribs, and positioned between said first pipe and said conduit, said flexible body held in place by said nut coacting with said conduit and an end of said flexible body.

18. A piping system as claimed in claim 17, wherein said nut includes inner threads that coact with said conduit threads, said nut includes an annular lip that defines a passageway through which said first pipe passes, said annular lip contacts an end of said flexible body of said mechanical seal and holds said flexible body of said mechanical seal in place.

19. A piping system as claimed in claim 18, wherein said flexible body of said mechanical seal comprises a tapered portion adapted to coact with said first tapered inner surface of said conduit.

20. A piping system as claimed in claim 19, wherein said flexible body of said mechanical seal includes an inner surface having a circumferential rings defined on an inner surface for coating with said first pipe.

21. A piping system as claimed in claim 19, further comprising a ring extending from an inner surface of said flexible body of said mechanical seal for coacting with a recess recess defined on an outer surface of said pipe for aligning said mechanical seal, said first pipe and said conduit.

22. A method for joining two thermoplastic pieces of pipe, comprising the steps of:
   a) providing two pieces of thermoplastic pipe;
   b) providing a mechanical seal and a fusable seal;
   c) providing a pipe conduit;
   d) attaching a mechanical seal on an end of each of the pieces of thermoplastic pipe or attaching at least one fusable seal to the pipe conduit;
   e) passing the ends of the pieces of thermoplastic pipe through ends of a thermoplastic pipe conduit and sandwiching the seals between the pipe conduit and the pieces of thermoplastic pipe; and
   f) forming a fluid tight seal between the thermoplastic pieces of pipe and the pipe conduit by either compressing the mechanical seal with a nut coacting with the pipe conduit or heating the sleeve until the sleeve and adjacent portions of the pipe conduit and the pipe melt.

23. piping system incorporating a mechanical seal and/or a fusion seal comprising:
   a first pipe made of thermoplastic material having a first pipe first end;
   a conduit for receipt of either a mechanical seal or a fusion seal having a body, said body having a conduit first end, said conduit includes a first inner tapered surface adjacent said conduit first end wherein said first inner tapered surface includes a plurality of circumferential rings, said body having an outer surface and an inner surface, said inner surface defining a passageway and a first receiving profile, said first pipe first end received by said conduit first end, said first receiving profile positioned coaxial with said first pipe; and
   first means for securing said first pipe to said conduit, said first means comprising either a mechanical seal or a fusion seal whereby said first receiving profile is configured to receive either said fusion seal or said mechanical seal.

24. A piping system incorporating a mechanical seal and/or a fusion seal comprising:
   a first pipe made of thermoplastic material having a first pipe first end;
   a conduit for receipt of either a mechanical seal or a fusion seal having a body, said body having a conduit first end having a first inner tapered surface adjacent thereto, said first inner tapered surface having a plurality of circumferential rings defined thereon, said body having an outer surface and an inner surface, said inner surface defining a passageway and a first receiving profile, said outer surface of said conduit adjacent said conduit first end and axially extending ribs defined about said conduit outer surface, said first pipe first end received by said conduit first end, said first receiving profile positioned coaxial with said first pipe; and
   first means for securing said first pipe to said conduit, said first means comprising either a mechanical seal or a fusion seal whereby said first receiving profile is configured to receive either said fusion seal or said mechanical seal.

25. A piping system incorporating a mechanical seal and/or a fusion seal comprising:
   a first pipe made of thermoplastic material having a first pipe first end;
   a conduit for receipt of either a mechanical seal or a fusion seal having a body, said body having a conduit first end, said body having an outer surface and an inner surface, said inner surface defining a passageway and a first receiving profile, said first pipe first end received by said conduit first end, said first receiving profile positioned coaxial with said first pipe; and
   first means for securing said first pipe to said conduit, said first means comprising either a mechanical seal or a fusion seal whereby said first receiving profile is configured to receive either said fusion seal or said mechanical seal, wherein said mechanical seal includes a flexible body received between said conduit and said first pipe and a nut, said flexible body held in place by said nut coacting with said conduit and an end of said flexible body, wherein said conduit further includes conduit threads defined on said outer surface of said conduit threadably engaged with said nut, a first tapered inner surface adjacent said conduit first end and a second inner tapered surface adjacent said conduit second end, and a plurality of circumferential rings defined on said inner surface, said mechanical seal body sealingly contacting said first tapered inner surface and circumferential ribs, and positioned between said first pipe and said conduit.

26. A piping system as claimed in claim 25, wherein said nut includes inner threads that coact with said conduit threads, said nut includes an annular lip that defines a passageway through which said first pipe passes, said annular lip contacts an end of said flexible body of said mechanical seal and holds said flexible body of said mechanical seal in place.

27. A piping system as claimed in claim 26, wherein said flexible body of said mechanical seal comprises a tapered portion adapted to coact with said first tapered inner surface of said conduit.

28. A piping system as claimed in claim 27, wherein said flexible body of said mechanical seal includes an inner surface having a circumferential rings defined on an inner surface for coating with said first pipe.

29. A piping system as claimed in claim 28, further comprising a ring extending from an inner surface of said flexible body of said mechanical seal for coacting with a recess defined on an outer surface of said pipe for aligning said mechanical seal, said first pipe and said conduit.

* * * * *

UNITED STATES PATENT AND TRADEMARK OFFICE
CERTIFICATE OF CORRECTION

PATENT NO.    : 6,450,544 B2
DATED         : September 17, 2002
INVENTOR(S)   : Allen R. Becker et al.

It is certified that error appears in the above-identified patent and that said Letters Patent is hereby corrected as shown below:

Column 4,
Line 46, " "Is" should read -- "s" --.

Column 7,
Line 38, "respectively. method" should read -- respectively. (new paragraph) The method --.

Column 9,
Line 3, "as claim" should read -- as claimed in claim --.

Column 11,
Lines 11-12, "a recess recess" should read -- a recess --.
Line 33, "piping system" should read -- A piping system --.

Signed and Sealed this

Eleventh Day of March, 2003

JAMES E. ROGAN
*Director of the United States Patent and Trademark Office*